United States Patent Office 3,778,291
Patented Dec. 11, 1973

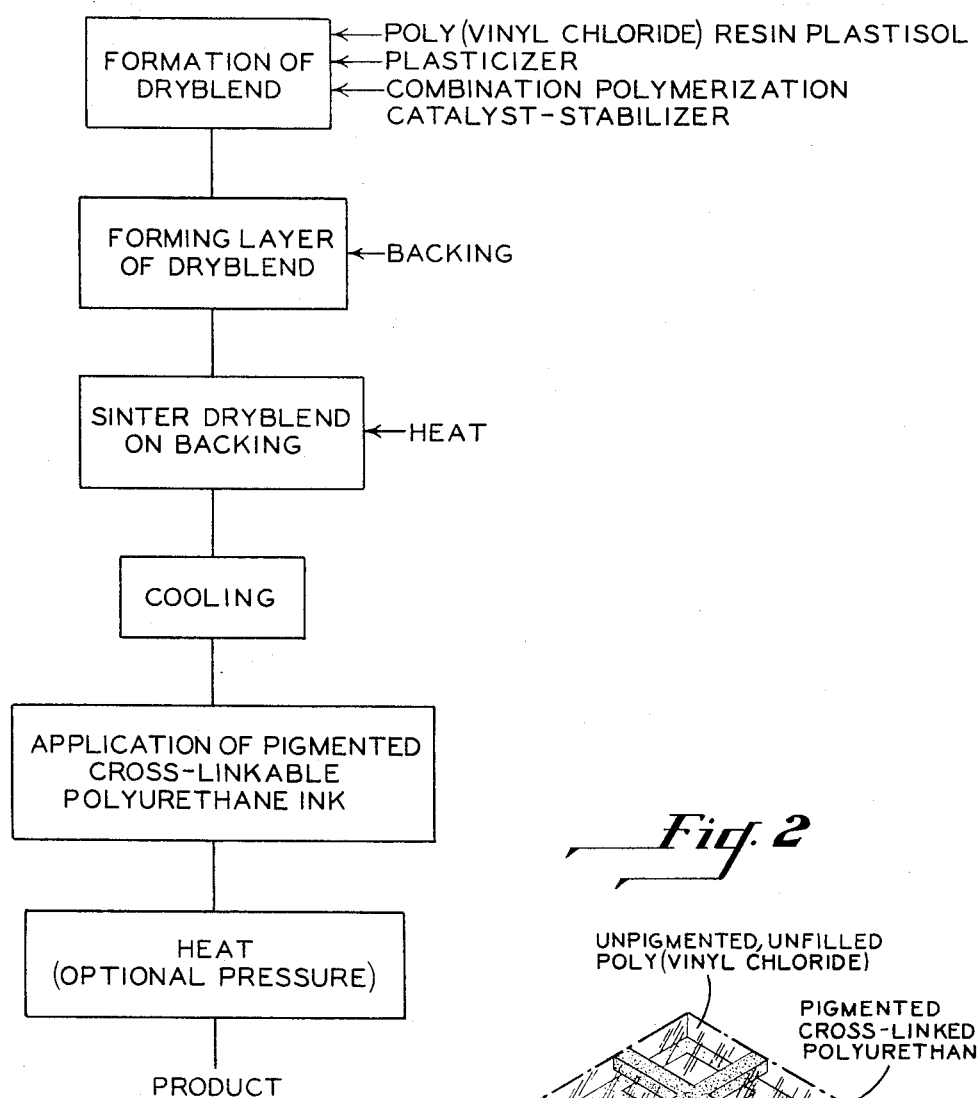
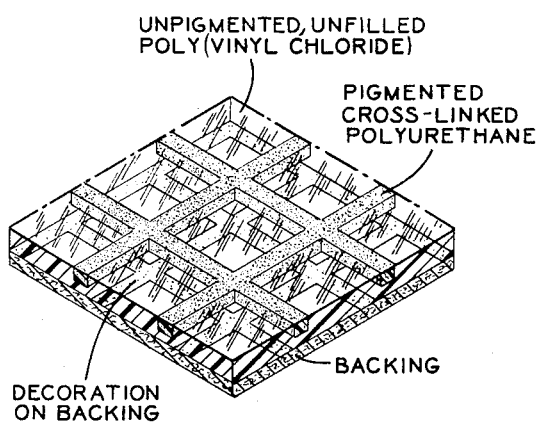

3,778,291
PROCESS FOR PRODUCING A DECORATIVE SURFACE COVERING
Charles G. Elliott, Landisville, and Richard P. Mazzur, Millersville, Pa., assignors to Armstrong Cork Company, Lancaster, Pa.
Filed Feb. 11, 1972, Ser. No. 225,447
Int. Cl. D06n 7/04; E04f 15/10
U.S. Cl. 117—21
8 Claims

ABSTRACT OF THE DISCLOSURE

A process for producing a flexible resinous composition surface covering by preparing a granular resinous dryblend containing a catalyst adapted to cure a noncatalyst-containing resinous system different from that of the dryblend, comprising depositing a layer of the catalyst-containing dryblend on a backing sheet, heating the granules to form a porous cohesive layer therefrom, cooling the layer and applying to the porous layer a different, non-catalyzed cross-linkable resinous liquid which will penetrate thereinto, and applying heat and/or heat and pressure to cause catalytic cross-linking of the resinous liquid and fusion of the resinous granules.

BACKGROUND OF THE INVENTION

Field of the invention

This invention in general relates to a process for forming a decorative resinous surface covering. It particularly relates to such a method wherein a curable, pigmented urethane system may be printed in any desired pattern on the surface of a sintered PVC drybiend containing a catalyst for curing the urethane. Penetration follows. Subsequent heat with or without pressure cross-links the urethane system and fuses the PVC system to form, ultimately, a surface covering.

Description of the prior art

U.S. Pat. 3,359,352—Powell et al. relates to a method for forming a resinous composition floor covering having geometric decorations on one surface thereof. This is accomplished by depositing a layer of fine granules of resinous composition on the surface of a base, heating to sinter the granules and form a porous layer, printing a design on the sintered layer with a printing composition which will penetrate into the porous composition and then, by heat, with or without pressure, forming the printed porous layer into a nonporous layer containing an inlaid design.

U.S. Pat. 3,577,257—Hutzler et al. relates to a method for forming a decorative coating on a solid substrate which comprises coating the substrate with a curable liquid polyurethane composition and distributing over the coating while it is not cured past the tacky stage, particle form, colored, inert solids carrying a curing aid for the polyurethane. A flood or cover coat of essentially clear polyurethane, which is also curable by the aforementioned curing aid, is applied over the colored particles embedded in the first polyurethane coat. If a smooth surface is desired, the surface of the pigmented particle-containing coating may be rolled or sanded to eliminate protruding portions of the particles after which a clear polyurethane top coat may be applied and the compositions allowed to cure. This process, by incorporating the curing aid for the polyurethane in the particulate solids rather than in the polyurethane, is said to provide adequate working time for the coating to be applied to the substrate, improves the coloring potential, shortens curing time, and eliminates the waste and economic loss incurred by use of prior methods.

U.S. Pat. 3,365,353—Whitman relates to a method for forming chemically embossed resinous surface covering which comprises blending a vinyl resin, a blowing agent, a plasticizer therefor, and a polymerizable monomer compatible with the plasticized vinyl resin. A sheet is formed therefrom and there is then applied to the sheet in a predetermined pattern a composition comprising a liquid which will penetrate the sheet, and a catalyst that will cause polymerization of the monomer. The resulting sheet is then heated to polymerize the monomer, fuse the plasticized resin, and decompose the blowing agent.

The foregoing prior art does not, however, provide a process for forming a flexible, decorative vinyl resin floor covering carrying a cross-linked polyurethane design printed thereon wherein a noncatalyst-containing resinous ink is printed onto a sintered PVC drybiend which carries a stabilizer compatible with the drybiend and which is also a curing or cross-linking catalyst for the polyurethane printing ink, all accomplished in a high temperature cure in a speedy manufacturing operation. Such a process provides a stronger, more full-bodied product with far greater ease and efficiency. This is made possible through the prolonged pot life of the resinous ink which is sufficient to allow screen printing of a decorative pattern, which results in better penetration of the ink into the drybiend. Better control of uniformity of the amount of ink applied is achieved, as well as better control of quality, durability, and curing. Also, reduced sensitivity to moisture in pigments allows greater use of pigmented systems. It is the primary object of this invention to provide such a process. It is an additional object to provide a process for forming a through-grained, urethane surfaced floor covering on a poly(vinyl chloride) base having added apparent bulk, longer wear and easier maintenance.

SUMMARY OF THE INVENTION

This invention relates to a process for producing a resinous composition surface covering wherein a granular resinous drybiend containing a catalyst adapted to cure a resinous system different from that of the drybiend is prepared and a layer thereof is deposited on a backing sheet. The drybiend is then heated to form a porous cohesive layer which is subsequently cooled. A cross-linkable resinous liquid is then applied to predetermined areas of the porous layer, and penetrates thereinto. Subsequently applied heat, and/or heat and pressure, causes cross-linking of the resinous liquid and fusion of the resinous granular material to ultimately form a decorative surface covering.

Typical catalysts which may be employed include organo tin compounds such as: dibutyl tin maleate, dibutyl tin dilaurate, organo zinc compounds, i.e., zinc octoate, zinc 2-ethyl hexanoate and other zinc soaps, organic lead compounds, and also certain inorganic salts of tin, lead and zinc. The catalysts should be used in an amount sufficient to modify the printing or coating material with which it comes in contact and to stabilize the vinyl resin.

The coating liquid may be printed, sprayed, coated or otherwise deposited on the surface of the base resinous material and may be an overall coating or may be aplied in a variety of patterns.

BRIEF DESCRIPTION OF THE DRAWING

FIG. 1 is a flow diagram depicting the steps followed in carrying out the method of this invention; and
FIG. 2 is a perspective view of a portion of a product formed by the method of this invention.

DESCRIPTION OF THE PREFERRED EMBODIMENT

This invention is applicable to all resinous materials, such as vinyls, which, in granular form, may be formed into a cohesive porous layer on a carrier, and which are compatible with and stabilized by an included catalyst for curing a subsequently applied different resinous system containing no catalyst.

As used in this invention, the term "compatible" means that the combination stabilizer-catalyst is intimately dispersible in the resinous granular material composition so that it subsequently reacts with the later applied resinous ink composition.

As shown by the flow diagram in FIG. 1 of the drawing, the manufacturing process begins with the formation of the polymerization catalyst-containing dryblend.

A resinous mix commonly referred to as a vinyl dryblend is in the form of a free-flowing, powdery, homogeneous mixture of unfused thermoplastic vinyl resin particles, liquid vinyl plasticizers diffused in the resin particles, filler, pigment, and vinyl stabilizer.

The polymerization catalyst-containing dryblend used in this invention is a free-flowing powder of resin, combination polymerization catalyst-stabilizer and plasticizer. The dryblend may be readily formed by adding the resin, for example a homopolymer of vinyl chloride, in the form of discrete particles, a polymerization catalyst-stabilizer such as dibutyl tin maleate, along with a vinyl resin plasticizer such as di(2-ethyl hexyl) phthalate, butyl benzyl phthalate, epoxidized soybean oil, tricresyl phosphate, or other commonly used plasticizers (additional stabilizers may be used provided they are not anticatalytic) to a mixer or blender such as a Henschel blender where they are mixed under moderate heat, for instance at a temperature of about 200° F., for a period of time to ensure that the liquid plasticizer and catalyst-stabilizer become absorbed and thus diffused throughout the resin particles and the remaining ingredients adsorbed thereon. Care is taken so that no fusion of the resin particles occurs during the mixing and the temperature must be kept below the point at which such fusion would occur.

Generally speaking, any desired addition of fillers and pigments to the mix may be made either initially, at the end of the mixing cycle when the resin particles remain relatively warm, or after the dryblended resin particles have been mixed and cooled. Fillers usable in this invention may include limestone, silica, diatomaceous earth, etc. The pigments may be dry pigments, or pigment pastes in plasticizer. The color of the dryblend layer or layers may be controlled over a wide range and substantially transparent or translucent layers may be achieved by omitting the filler and most or all of the pigment from the vinyl dryblend forming these layers. Based on 100 parts by weight of resin, 0 to 50 parts by weight plasticizer, 1 to 5 parts by weight catalyst-stabilizer and, if desired, 0 to 5 parts by weight pigment and 0 to 25 parts by weight filler may be used in forming the free-flowing mixture.

The next step in the manufacturing process is the deposition of the plasticized poly(vinyl chloride) dryblend containing the stabilizer-polymerization catalyst on a backing such as a beater saturated rubber asbestos sheet, for example. Other fibrous backings may include resin-bonded glass webs, bonded synthetic webs, etc. These backings may become the final backing or may be supplemented with other cushioning materials, such as foams, nonwoven material, etc. Optionally, the backing may be coated with barrier and/or key coats such as acrylic or vinyl latices or with lacquers which may be pigmented. The backing may itself be decorated, as by rotogravure printing, and such decorative printing may be visible in the final product through unpigmented portions of the top layers.

The next step in the process involves heating the dryblend to cause partial melting of the resin granules at their points of contact, thereby forming bonds which result in the formation of a porous cohesive layer which is also bonded to the carrier. This may be done by heating in an oven, by using radiant heat or by hot air impingement. The heating is not sufficient to cause fusion of the resin system. The times and temperatures involved are dependent on the formulations used.

After cooling the sheet, the next step in the invention involves the production of a design on the porous layer by the application of a cross-linkable resinous liquid to predetermined portions thereof. Usable cross-linkable urethane systems which may be used include, for example: mixtures of hydroxyl-terminated polyesters or polyethers, linear and/or branched, or mixtures thereof, with an isocyanate such as toluene diisocyanate, 4,4'-methylene bis-(phenyl isocyanate), 4,4'-methylene bis(cyclohexyl isocyanate) or 3-isocyanate-methyl-3,5,5-trimethyl cyclohexyl isocyanate. These catalytically cross-linkable urethane systems are well known in the art.

After cooling, the porous layer may be printed with the catalytically curable urethane ink in sufficient amounts to cause penetration thereof through up to about 80% of the thickness of the layer at the points of application. Printing may be done, for example, by a flat, or rotary screen printer. This ensures deeper penetration of the ink in comparison to the lesser penetration that would be obtained by rotogravure printing, for example. The inks may be colored as desired by means of dyes or pigments, or the inks may be colorless. Optionally, a final, clear, urethane coating may be applied to the surface of the porous layer just before heating to provide a tough wear-resistant surface thereto.

The next step in the invention is the application of heat with or without pressure to cross-link the resinous liquid and fuse the resinous granular material to ultimately form a decorative surface covering. When heat and pressure are used in this step of the invention, for example, the printed porous sheets may be placed between sheets of a release material such as glass reinforced polytetrafluoroethylene which may then be placed in a press at room temperature. The press is then closed and heated. Under these conditions the urethane printing ink is cured and the resinous granules fused, resulting in a durable and decorative surface covering.

The visual and physical characteristics of the surface covering may be further altered by mechanical embossing, or by after-finish coating to enhance appearance and utility.

As shown in FIG. 2 of the drawings, a product which may be produced through the use of the process disclosed by this invention is a flexible, decorative vinyl floor covering. Products which may be manufactured within the scope of this invention include, but are not limited to, floor coverings, wall coverings, counter tops, and automotive flooring.

The following examples are given for purposes of illustration. All parts are by weight unless otherwise stated.

EXAMPLE I

Dryblend granules were prepared by mixing the following components together in a conventional Henschel dry-blending apparatus through a heat history from ambient conditions to 220° F. to ambient conditions.

| | Parts |
|---|---|
| Poly(vinyl chloride) | 100 |
| Dioctyl phthalate | 35 |
| Dibutyl tin maleate (catalyst and stabilizer) | 2 |

A beater saturated sheet of rubber and asbestos of approximately 0.037 inch thickness was coated on one surface with a combination of acrylic lacquer and vinyl chloride vinyl acetate emulsion to seal the surface and provide adhesion of the PVC dryblend to the base sheet.

The granules were deposited on the coated base sheet to form a uniform layer of 80 to 100 mils thickness. The sheet was then passed through a 30-foot long oven at a line speed of 15 feet to 20 feet per minute. The granules during this heating period reached a material temperature of about 270°–290° F. to sinter the dryblend. This resulted in a 50–60 nil layer of sintered dryblend.

The sintered mass was then cooled and a design printed on its surface. The printing ink had the following composition:

Hydroxyl-terminated polyester resin, hydroxyl No., 205–221; acid No., 4.0 (max.) (Multron R–10) _____ 20
4,4'-methylene bis(phenyl isocyanate) _____ 10.2

The diisocyanate was melted and the esters added. The above composition was applied to the dryblend using a 6 mil Bird applicator. The sheet so formed was then placed between sheets of glass reinforced polytetrafluoroethylene and put into a press at ambient temperature. The press was closed, steam was turned into both platens, and the system was heated in the range of from 250° F. to 300° F. to fuse the dryblend and cross-link the printing composition. Water was then introduced into the platens, the system cooled to about 100° F. and the sheet removed. The resulting sheet was 30 to 35 mils thick.

EXAMPLE II

A decorative vinyl floor covering was formed as in Example I replacing the catalyst-stabilizer in the dryblend with zinc octoate which was dissolved in hot dioctyl phthalate and, replacing the 4,4'-methylene bis(phenyl isocyanate) in the ink composition with 10.4 parts of 4,4'-methylene bis(cyclohexyl isocyanate).

What is claimed is:
1. A process for producing a flexible surface covering having a decorative wear surface comprising:
   (1) preparing a vinyl resin dryblend containing a catalyst capable of curing a subsequently applied non-catalyst-containing cross-linkable polyurethane ink;
   (2) depositing a layer of the dryblend on a backing sheet;
   (3) heating to form an unfused cohesive porous layer from said dryblend;
   (4) applying a cross-linkable polyurethane ink to at least a portion of said porous layer in an amount sufficient to permit penetration thereinto to the desired depth at the points of application; and
   (5) applying heat to catalytically cross-link the polyurethane ink, fuse the resinous dryblend and bond it to the backing.

2. The process according to claim 1 wherein the vinyl resin is poly(vinyl chloride).

3. The process according to claim 2 wherein the ink comprises 20 parts by weight hydroxyl-terminated polyester and 10 parts by weight of 4,4'-methylene bis(phenyl isocyanate).

4. The process of claim 2 wherein the ink comprises 20 parts by weight of hydroxyl-terminated polyester and 10.4 parts of 4,4'-methylene bis(cyclohexyl isocyanate).

5. The process of claim 2 wherein the catalyst is present in an amount of from about 1 to 5 parts and the plasticizer is present in an amount of from about 0 to 50 parts, all by weight based on 100 parts by weight of the resin.

6. The process according to claim 2 wherein the catalyst is dibutyl tin maleate or zinc octoate.

7. The process according to claim 1 wherein the backing is decorated prior to deposition of the dryblend thereon.

8. The process according to claim 1 wherein the polyurethane ink is applied to the entire top surface of the porous dryblend layer.

References Cited
UNITED STATES PATENTS

| | | | |
|---|---|---|---|
| 3,359,352 | 12/1967 | Powell et al. | 264—54 |
| 3,577,257 | 5/1971 | Hutzler et al. | 117—26 |
| 3,144,355 | 8/1964 | Raskin | 117—12 |
| 2,995,482 | 8/1961 | Boyce et al. | 117—21 |
| 3,102,043 | 8/1963 | Winthrop et al. | 117—21 |
| 3,365,353 | 1/1968 | Witman | 117—11 |

WILLIAM D. MARTIN, Primary Examiner

W. R. TRENOR, Assistant Examiner

U.S. Cl. X.R.

117—12, 26, 62.2, 72, 76; 156—77, 85, 155; 264—45, 54